US011967443B2

(12) United States Patent

Kimura

(10) Patent No.: US 11,967,443 B2

(45) Date of Patent: Apr. 23, 2024

(54) CHIP RESISTOR AND METHOD OF MANUFACTURING CHIP RESISTOR

(71) Applicant: KOA CORPORATION, Ina (JP)

(72) Inventor: Taro Kimura, Ina (JP)

(73) Assignee: KOA CORPORATION, Ina (JP)

( * ) Notice: Subject to any disclaimer, the term of this patent is extended or adjusted under 35 U.S.C. 154(b) by 0 days.

(21) Appl. No.: 17/959,641

(22) Filed: Oct. 4, 2022

(65) Prior Publication Data

US 2023/0133764 A1 May 4, 2023

(30) Foreign Application Priority Data

Nov. 2, 2021 (JP) ................................ 2021-179604

(51) Int. Cl.

*H01C 1/142* (2006.01)

*H01C 7/00* (2006.01)

(52) U.S. Cl.

CPC ............. *H01C 1/142* (2013.01); *H01C 7/003* (2013.01)

(58) Field of Classification Search

CPC ................................ H01C 1/142; H01C 7/003

See application file for complete search history.

(56) References Cited

U.S. PATENT DOCUMENTS 6,492,896 B2 * 12/2002 Yoneda .................. H01C 7/003 338/195

6,856,234 B2 * 2/2005 Kuriyama .............. H01C 1/142 338/332

6,982,624 B2 * 1/2006 Saito ...................... H01C 1/142 338/332

7,098,768 B2 * 8/2006 Doi ...................... H01C 17/281 338/328

10,453,593 B2 * 10/2019 Shinoura ................ H01C 1/142

10,832,837 B2 * 11/2020 Shinoura ................ H01C 17/02

2015/0097650 A1 * 4/2015 Shimura ................ H01C 7/008 252/519.12

FOREIGN PATENT DOCUMENTS

JP 5957693 B2 7/2016

* cited by examiner

*Primary Examiner* — Kyung S Lee

(74) *Attorney, Agent, or Firm* — Oliff PLC

(57) ABSTRACT

A chip resistor includes: an insulating substrate; a pair of front electrodes; a resistor connecting between both the front electrodes; an undercoat layer provided on the resistor; an overcoat layer provided on the undercoat layer, an auxiliary film provided so as to be over a connecting portion between the front electrode and the resistor at a position away from an end face of the insulating substrate; a pair of end face electrodes; and a pair of external plating layers covering the end face electrodes, the front electrodes, and the auxiliary film, wherein the auxiliary film is formed of a resin material containing metal particles, and a portion of the auxiliary film is sandwiched between the undercoat layer and the overcoat layer.

5 Claims, 6 Drawing Sheets

PRIOR ART

CHIP RESISTOR AND METHOD OF MANUFACTURING CHIP RESISTOR

TECHNICAL FIELD

The present invention relates to a chip resistor and a method of manufacturing the same.

BACKGROUND ART

A chip resistor typically includes a rectangular parallelepiped insulating substrate, a pair of front electrodes facing each other with a predetermined interval therebetween and provided on a surface of the insulating substrate, a pair of back electrodes facing each other with a predetermined interval therebetween and provided on the back surface of the insulating substrate, a pair of end face electrodes for electrically connecting the front electrodes and the back electrodes, a pair of external plating layers for covering each of the electrodes above, a resistor for bridging the pair of front electrodes, and an insulating protective film for covering the resistor.

In this type of chip resistor, usually, the front electrodes are made of an Ag (silver) based metal material having low resistivity, and the external plating layers are formed so as to cover the front electrodes. Since strongly corrosive sulfide gas or the like easily enters a gap which is a boundary portion between the external plating layer and the protective film, a front electrode portion at a boundary position between the front electrode and the protective film may be corroded by the sulfide gas. Such corrosion may cause problems, for example, change in resistance and disconnection.

In view of these problems, as illustrated in FIG. 9A, there has been conventionally proposed a chip resistor in which an auxiliary film 100 made of resin containing metal particles and carbon particles is formed on a top surface of a front electrode 101, and the auxiliary film 100 is disposed at a boundary position between an external plating layer 102 and a protective film 103, whereby the auxiliary film 100 blocks sulfide gas entering from a boundary portion between the external plating layer 102 and the protective film 103 to avoid exposure of the front electrode 101 to the sulfide gas (for example, see Patent Literature 1).

In this type of chip resistor, electroplating, which is advantageously lower in cost and has shorter plating time than electroless plating, is widely employed for formation of the external plating layers. In such electroplating, a plating layer is formed on a surface of an object to be plated having conductivity, and thus, as illustrated in FIG. 9A, the external plating layer 102 is formed so as to cover a surface of the end face electrode 104 and that of the auxiliary film 100. Here, in FIGS. 9A and 9B, reference signs 105, 106, 107 indicate an insulating substrate, a resistor, and a back electrode, respectively.

CITATION LIST

Patent Literature

Patent Literature 1: JP-B-5957693

SUMMARY OF INVENTION

Technical Problem

In the case of a chip resistor having a low resistance (for example, 100 mΩ or less), a resistance of a front electrode affects a resistance of the entire chip resistor, and thus the lower the resistance of the chip resistor is, the more a TCR increases. The chip resistor described above and illustrated in FIG. 9A has such a structure that a portion of the protective film 103 is inserted between the auxiliary film 100 and the resistor 106. In this structure, in a mounted state in which the external plating layer 102 is soldered to a land of a circuit board, as illustrated by an arrow in FIG. 9B, the electric current supplied from the external plating layer 102 flows from the auxiliary film 100 to the resistor 106 through the front electrode 101 immediately below the protective film 103. This increases the length of a portion of the front electrode 101 which is between the auxiliary film 100 and the resistor 106 in the electric current path from the electrode region (entire region including the front electrode 101, the external plating layer 102, and the auxiliary film 100) to the resistor 106, resulting in increase of a resistance component of the front electrode 101 located in this portion and thus deterioration of the TCR by the increased amount.

Furthermore, in the chip resistor illustrated in FIG. 9A described above, the auxiliary film 100 blocks the sulfide gas entering from the boundary portion between the external plating layer 102 and the protective film 103, however, in the case where the protective film 103 is formed of a resin material such as epoxy, especially in a moisture-resistant atmosphere, the sulfide gas may permeate through the protective film 103 and thus the portion of the front electrode 101 which is located immediately below the protective film 103 is easily sulfurized.

The present invention has been made in view of the circumstances of the prior art described above, and a first object thereof is to provide a chip resistor capable of ensuring a low TCR even in the case where it has a low resistance while maintaining sulfurization resistance, and a second object thereof is to provide a method of manufacturing such a chip resistor.

Solution to Problem

In order to achieve the first object, the present invention provides a chip resistor comprising: a rectangular parallelepiped insulating substrate; a pair of electrodes provided at both ends of a main surface of the insulating substrate; a resistor that connects between the pair of electrodes; a first insulating protective film provided on the resistor; a second insulating protective film provided on the first protective film; a conductive auxiliary film provided so as to be over a connecting portion between one of the electrodes and the resistor at a position away from an end face of the insulating substrate; a pair of end face electrodes extending at both end faces of the insulating substrate so as to be connected to the electrodes; and a pair of external plating layers covering the end face electrodes, the electrodes, and the auxiliary film, wherein the auxiliary film is formed of a material with sulfide-resistant properties more than that of the electrodes, and a portion of the auxiliary film is sandwiched between the first protective film and the second protective film.

The chip resistor having the structure as described above includes the auxiliary film which is provided inside the boundary portion where the external plating layer and the second protective film are in contact with each other. The auxiliary film is formed of a material with sulfide-resistant properties more than that of the electrodes, and a portion of the auxiliary film is sandwiched between the first protective film and the second protective film. The auxiliary film blocks the sulfide gas that has entered from the boundary portion between the external plating layer and the second protective layer, and thus the sulfide gas cannot reach the electrodes. This enables prevention of sulfidation of the electrodes. Furthermore, forming the auxiliary film at a position to be over a connecting portion between one of the electrodes and the resistor shortens the length of a portion of the electrode located between the auxiliary film and the resistor in the electric current path from the electrode region (entire region including the front electrode, the external plating layer, and the auxiliary film) to the resistor. Still further, the thickness of the auxiliary film allows the electric current to easily flow. Therefore, reduction in the resistance of the electrode portion can be realized and thus it is possible to ensure a low TCR even in the case of a chip resistor having a low resistance.

In the chip resistor having the structure as described above, a material of the auxiliary film is not particularly limited as long as it has conductivity. Meanwhile, preferably, forming the auxiliary film with a resin material containing conductive particles such as carbon particles and metal particles enables easy formation of the auxiliary film.

In the chip resistor having the structure as described above, in the case where a connecting portion of the resistor with one of the electrodes is an exposed portion that is not covered with the first protective film and the exposed portion is entirely covered with the auxiliary film, the area of the electrode connected to the external plating layer at a position not covered by the auxiliary film can be increased. In other words, the length of a portion of the electrode which is located in the electric current path from the electrode region through the auxiliary film to the resistor can be shortened. This enables reduction in the resistance of the electrode portion and thus more effective suppression of the deterioration in the TCR.

In the chip resistor having the structure as described above, in the case where both the first protective film and the second protective film are set to be short with respect to a length of the resistor in a direction between the electrodes, the auxiliary film is located above the connecting portion between the resistor and the electrode and the outer plating layer is formed further above the auxiliary film, and thus the entire surface of the electrode is covered with the outer plating layer. As a result, the resistivity of the electrode portion can be further lowered, thereby improving the TCR.

In the chip resistor having the structure as described above, in each of the electrodes, forming a portion thereof other than a connecting portion with the resistor is thicker than the connecting portion with the resistor causes a concave step at the boundary position between the electrode and the resistor. This concave step enables accurate formation of the auxiliary film at a predetermined position.

A method of manufacturing a chip resistor, comprising: forming, on an insulating substrate, a resistor and electrodes connected to both ends of the resistor; forming a first protective film made of a glass material so as to cover at least a portion of the resistor; forming an auxiliary film made of a resin material containing conductive particles at a position over a connecting portion between one of the electrodes and the resistor; forming a second protective film made of a resin material so as to cover a portion of the auxiliary film and the first protective film; forming an end face electrode connected to corresponding one of the electrodes by performing sputtering of metal particles onto an end face of the insulating substrate; and forming an external plating layer covering the end face electrode, the corresponding one of the electrodes, and the auxiliary film by performing electroplating.

In the case where the method of manufacturing the chip resistor having the structure as described above further comprises, in each of the electrodes, forming a second electrode on a portion other than a connecting portion with the resistor as a preliminary step of forming the auxiliary film, such formation of the second electrode causes a concave step in the boundary position of the electrode with the resistor. This concave step enables suppression of flow of the resin onto the second electrode when the auxiliary film made of a resin material is formed in this concave step, and therefore, it is possible to accurately form the auxiliary film at a predetermined position.

Advantageous Effects of Invention

According to the present invention, it is possible to provide a chip resistor capable of ensuring a low TCR even in the case where it has a low resistance while maintaining sulfurization resistance.

DESCRIPTION OF EMBODIMENTS

Hereinafter, embodiments of the present invention will be described with reference to the drawings.

Figure 1:
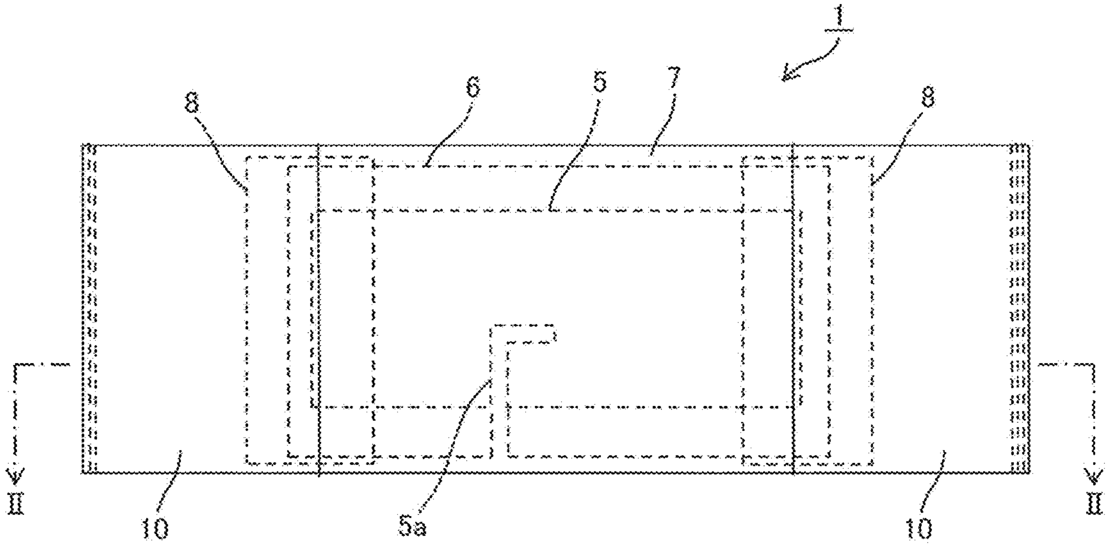
FIG. 1 is a plan view of a chip resistor according to a first embodiment.
Figure 2:
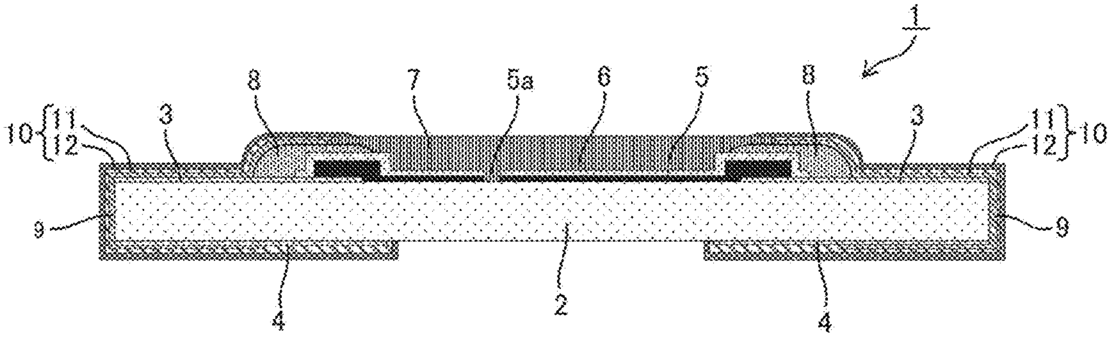
FIG. 2 is a cross-sectional view taken along the line II-II of FIG. 1.
Figure 3A:
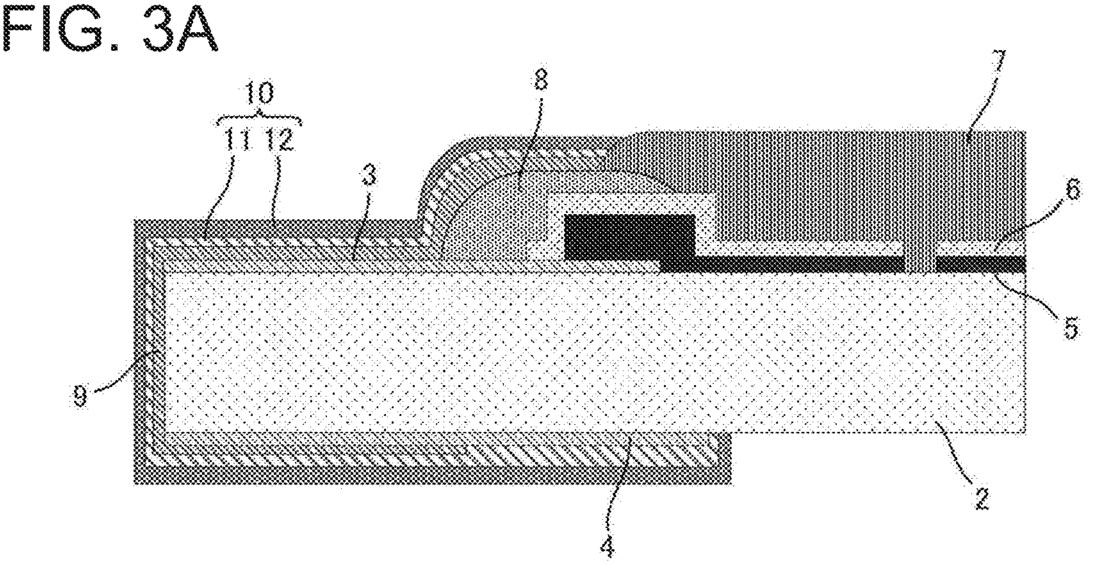
FIGS. 3A and 3B are a cross-sectional view of an enlarged left half of FIG. 2.
Figure 3B:
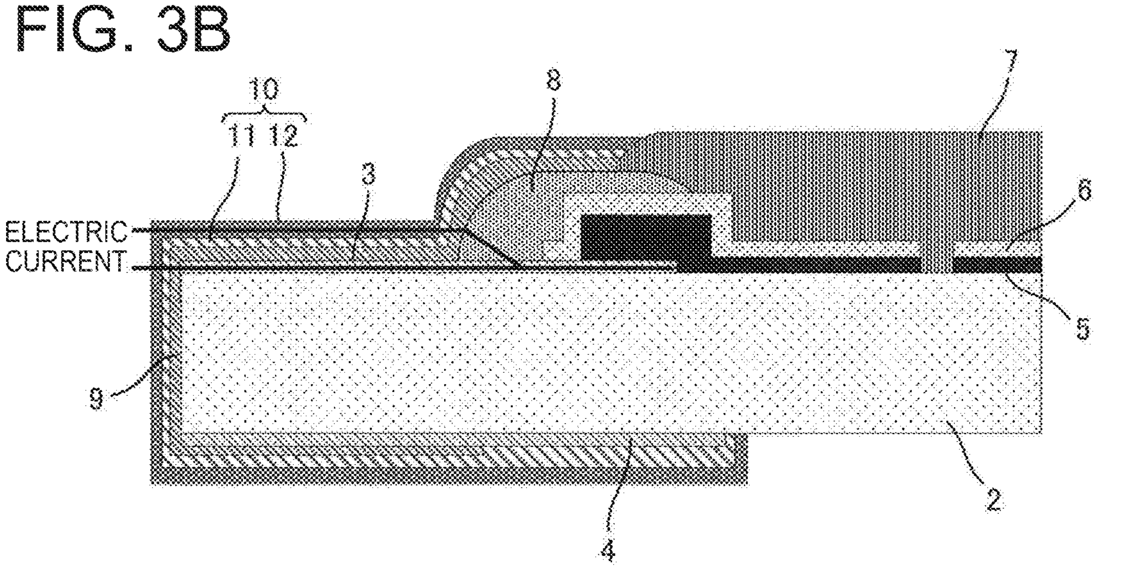

FIG. 1 is a plan view of a chip resistor according to a first embodiment of the present invention, FIG. 2 is a cross-sectional view taken along the line II-II of FIG. 1, FIGS. 3A and 3B are a cross-sectional view of the enlarged left half of FIG. 2, FIG. 4A to 4H are a plan view illustrating manufacturing processes of the chip resistor, and FIG. 5A to 5H are a cross-sectional view illustrating the manufacturing processes of the chip resistor.

As illustrated in FIG. 1 to FIGS. 3A and 3B, the chip resistor 1 according to the first embodiment includes a rectangular parallelepiped insulating substrate 2, a pair of front electrodes 3 provided at both ends in the longitudinal direction of the insulating substrate 2 on the upper surface thereof, a pair of back electrodes 4 provided at both ends in the longitudinal direction of the insulating substrate 2 on the lower surface thereof, a rectangular resistor 5 provided so as to connect between the pair of front electrodes 3, an undercoat layer (first protective film) 6 provided so as to cover the entire resistor 5 including connecting portions with the front electrodes 3, an overcoat layer (second protective film) 7 provided so as to cover the undercoat layer 6, a pair of auxiliary films 8 provided at both ends of the undercoat layer 6 and overcoat layer 7, a pair of end face electrodes 9 extending at both end faces of the insulating substrate 2 so as to electrically connect between the front electrodes 3 and the back electrodes 4, and a pair of external plating layers 10 provided so as to cover the entire end face electrodes 9 and also cover portions of the back electrodes 4 which are exposed from the end face electrodes 9.

The insulating substrate 2 is made of ceramics or the like, which is obtained by dividing a large-sized substrate, which will be described later, along a primary division groove and a secondary division groove extending vertically and the horizontally, respectively.

The front electrodes 3 are obtained by screen-printing an Ag (silver) based paste containing 1 wt % to 5 wt % of Pd (palladium) and drying and firing the printed paste. The back electrodes 4 are obtained by screen-printing the Ag paste and drying and firing the printed paste.

The resistor 5 is obtained by screen-printing a resistive paste such as ruthenium oxide and drying and firing the printed paste. Both ends in the longitudinal direction of the resistor 5 overlap the front electrodes 3. The resistor 5 is provided with a trimming groove 5*a* for adjusting a resistance, and the trimming groove 5*a* is formed by irradiating a laser beam from above the undercoat layer 6.

The undercoat layer 6 is obtained by screen-printing a glass paste and drying and firing the printed paste. The undercoat layer 6 is formed so as to cover the entire resistor 5 prior to formation of the trimming groove 5*a*.

The overcoat layer 7 is obtained by screen-printing a resin paste such as epoxy or phenol and heating and curing (burning) the printed paste. The overcoat layer 7 is formed so as to cover the undercoat layer 6 after the trimming groove 5*a* is provided in the undercoat layer 6. An insulating protective film having a double layer structure is formed with these undercoat layer 6 and overcoat layer 7.

The auxiliary films 8 are made of a material with sulfide-resistant properties more than that of the front electrodes 3, and specifically, they are obtained by screen-printing a resin paste containing carbon particles and heating and curing the printed paste, or obtained by screen-printing a resin paste containing metal particles such as Ag, Cu, or Ni and heating and curing the printed paste. The auxiliary films 8 are formed on portions of the front electrodes 3 which are away from the end faces of the insulating substrate 2, and provided at positions over the connecting portions between the front electrodes 3 and the resistor 5. Furthermore, a portion of each of the auxiliary films 8 is sandwiched between the undercoat layer 6 and the overcoat layer 7, and each end portion of the overcoat layer 7 overlaps a portion (inner end portion) of each of the auxiliary film 8.

The end face electrodes 9 are obtained by sputtering of nickel (Ni)/chromium (Cr) or the like so as to electrically connect between the front electrodes 3 and the back electrodes 4 which are separated via the end faces of the insulating substrate 2. The end face electrodes 9 cover not only the end faces of the insulating substrate 2, but also cover portions of the lower surfaces of the back electrodes 4 which are located near the end faces of the insulating substrate 2, the upper surfaces of the front electrodes 3, and the surfaces of the auxiliary films 8.

Each of the external plating layers 10 has a double layer structure composed of a barrier layer 11 provided on the inner layer side and an external connection layer 12 provided on the outer layer side to cover the barrier layer 11. The barrier layer 11 is a Ni plating layer formed by electroplating, and is formed so as to cover the entire end face electrode 9 and a portion of the back electrode 4 which is exposed from the end face electrode 9. The external connection layer 12 is an Sn plating layer formed by electroplating, and is formed so as to cover the entire surface of the barrier layer 11.

Next, a method of manufacturing the chip resistor 1 having the structure as described above will be explained with reference to FIG. 4A to 4H and FIG. 5A to 5H.

Firstly, a large-sized substrate 2A provided with the primary division groove and the secondary division groove, which extend to form a grid, is prepared. Providing the primary division groove and the secondary division groove allows both front and back surfaces of the large-sized substrate 2A to be divided into a number of chip forming regions, and each of the chip forming regions serves as a single unit of the insulating substrate 2. FIG. 4A to 4H and FIG. 5A to 5H illustrate a single chip forming region as a representative example, however, in practice, a large number of such chip forming regions are arranged in a grid pattern.

Then, after the Ag paste is screen-printed on the back surface of the large-sized substrate 2A, the printed paste is dried and fired at 850° C., thereby forming the pair of back electrodes 4 facing each other with a predetermined interval therebetween at both ends in the longitudinal direction of each of the chip-forming regions.

Figure 4A:
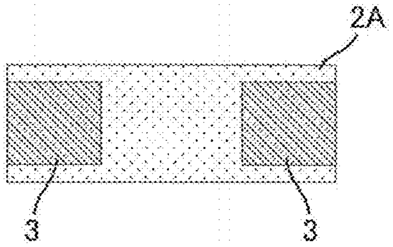
FIG. 4A to 4H are a plan view illustrating manufacturing processes of the chip resistor.
Figure 5A:
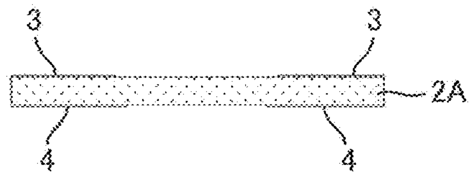
FIG. 5A to 5H are a cross-sectional view illustrating the manufacturing processes of the chip resistor.

Next, after the Ag—Pd paste is screen-printed on the surface of the large-sized substrate 2A, the printed paste is dried and then fired at 850° C., thereby, as illustrated in FIG. 4A and FIG. 5A, forming a pair of front electrodes 3 facing each other with a predetermined interval therebetween at both ends in the longitudinal direction of each of the chip forming regions. Note that the order of forming the front electrodes 3 and the back electrodes 4 may be reversed, or the front electrodes 3 and the back electrodes 4 may be formed simultaneously.

Figure 4B:
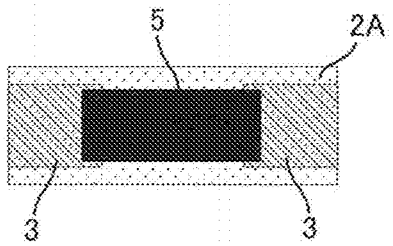
Figure 5B:
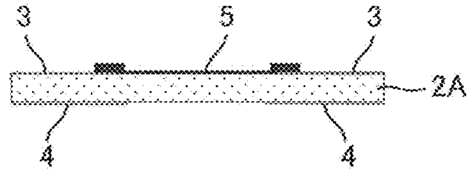

Next, after the resistive paste containing ruthenium oxide or the like is screen-printed on the surface of the large-sized substrate 2A, the printed paste is dried and then fired at 850° C., thereby, as illustrated in FIG. 4B and FIG. 5B, forming the rectangular resistor 5 whose both end portions overlap the front electrodes 3.

Figure 4C:
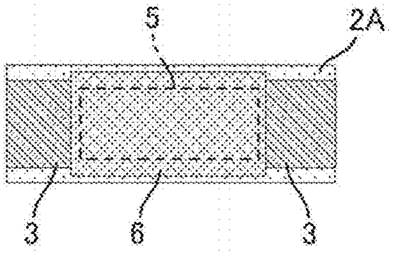
Figure 5C:
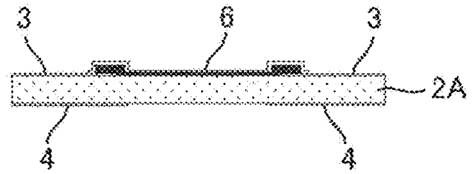

Next, after the glass paste is screen-printed in a region covering the resistor 5, the printed paste is dried and then fired at 600° C., thereby, as illustrated in FIG. 4C and FIG. 5C, forming the undercoat layer 6 which covers the entire resistor 5, including the connecting end portions with the front electrodes 3.

Figure 4D:
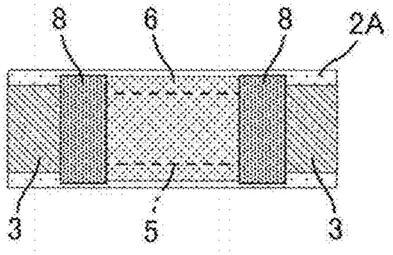
Figure 5D:
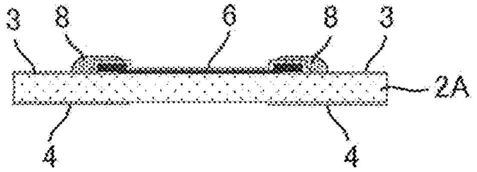

Next, after the resin paste containing metal particles such as Ag (or Cu, Ni) is screen-printed on the connecting portions between the front electrodes 3 and the resistor 5, the printed paste is dried and then heated and cured (burned) at 200° C., thereby, as illustrated in FIG. 4D and FIG. 5D, forming the pair of auxiliary films 8, each of which extends in a band shape over the connecting portion between the front electrode 3 and the resistor 5. Since each of the auxiliary films 8 is formed so as to be over the connecting portion where the front electrode 3 and the resistor 5 overlap each other, it has an upwardly convex cross-sectional shape (bowl shape).

Figure 4E:
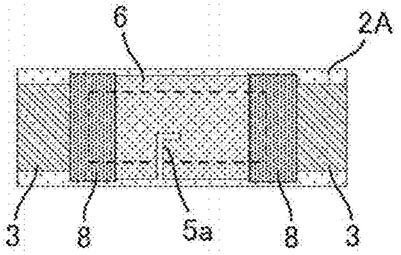
Figure 5E:
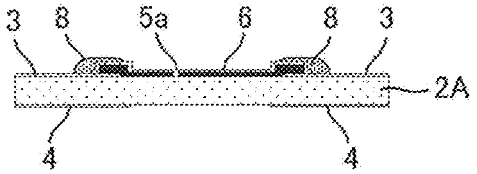

Next, a laser beam is irradiated from above the undercoat layer 6, thereby, as illustrated in FIG. 4E and FIG. 5E, forming a trimming groove 5*a* passing through the undercoat layer 6 and resistor 5 for the purpose of adjustment of a resistance of the resistor 5.

Figure 4F:
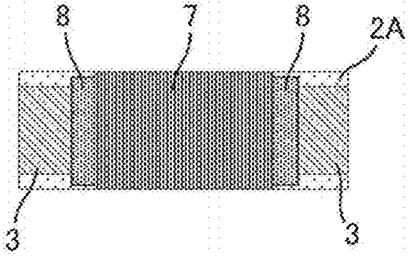
Figure 5F:
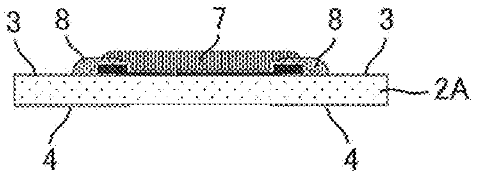

Next, after the resin paste of epoxy or phenol is screen-printed from above the undercoat layer 6, the printed paste is dried and then heated and cured at 200° C., thereby, as illustrated in FIG. 4F and FIG. 5F, forming the overcoat layer 7 that covers the entire surface of the undercoat layer 6 and also covers the portions of the auxiliary films 8 which overlap the undercoat layer 6 and are close to the ends thereof. At this time, since each of the auxiliary films 8 has the bowl-shaped cross section as described above, forming the end portions of the overcoat layer 7 on the inner side inclined surfaces of the auxiliary films 8 enables suppression of sagging of the printed paste of the overcoat layer 7 on the auxiliary films 8. Note that an insulating protective film having a double layer structure is formed with these undercoat layer 6 and overcoat layer 7.

The processes described so far are collectively performed with respect to the large-sized substrate 2A. On the other hand, in the next process, the large-sized substrate 2A is primarily divided along the primary division groove to obtain a strip-shaped substrate 2B whose width-dimension corresponds to the longitudinal direction of the chip forming region.

Figure 4G:
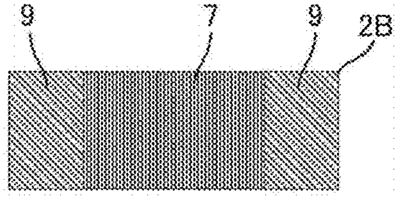
Figure 5G:
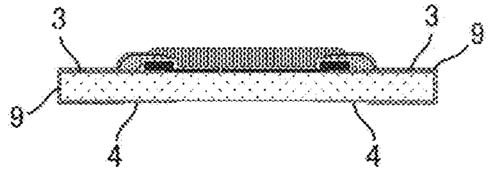

Next, sputtering of Ni/Cr is applied toward the divided faces (end faces) of the strip-shaped substrate 2B, thereby, as illustrated in FIG. 4G and FIG. 5G, forming the pair of end face electrodes 9 that electrically connects between the front electrodes 3 and the back electrodes 4. The end face electrodes 9 cover the entire end faces of the strip-shaped substrate 2B, portions of the lower surfaces of the back electrodes 4 which are located closer to the end faces of the strip-shaped substrate 2B, the upper surfaces of the front electrodes 3, and the surfaces of the auxiliary films 8.

Figure 4H:
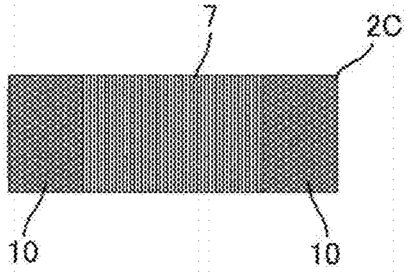
Figure 5H:
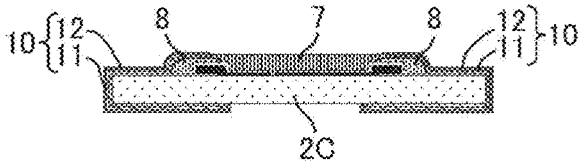

Next, after the strip-shaped substrate 2B is secondarily divided along the secondary division groove to obtain a plurality of chip-shaped substrates 2C, an Ni electroplating layer is formed on each of the chip-shaped substrates 2C, thereby forming the barrier layers 11 covering the entire end face electrodes 9 and also covers the portions of the back electrode 4 which are exposed from the end face electrodes 9 Thereafter, an Sn electroplating layer is formed on each of the chip-shaped substrates 2C, thereby, as illustrated in FIG. 4H and FIG. 5H, forming the external connection layers 12 covering the entire surfaces of the barrier layers 11. The external plating layers 10 having a double layer structure is formed with these barrier layer 11 and external connection layer 12. In this way, the chip resistor 1 as illustrated in FIG. 1 to FIG. 3A can be obtained.

As described above, the chip resistor 1 according to the first embodiment includes the auxiliary films 8 which are provided inside the boundary portions where the external plating layers 10 are in contact with the overcoat layer 7. The auxiliary films 8 are formed of a resin material containing conductive particles, and portions of the auxiliary films 8 are inserted between the undercoat layer 6 and the overcoat layer 7. Therefore, even if the sulfide gas enters from the boundary portions between the external plating layers 10 and the overcoat layer 7, the auxiliary films 8 block the sulfide gas and thus the sulfide gas cannot reach the front electrodes 3. This enables prevention of sulfidation of the front electrodes 3.

In the case of a chip resistor having a low resistance (for example, 100 mΩ or less), a resistance of the front electrodes 3 affects a resistance of the entire chip resistor, and thus the lower the resistance of the chip resistor is, the more a TCR increases. However, the chip resistor 1 according to the first embodiment includes the auxiliary films 8 formed at positions over the connecting portions between the front electrodes 3 and the resistor 5, and accordingly, as illustrated by the arrow in FIG. 3B, the length of a portion of the front electrode 3 which is located between the auxiliary film 8 and the resistor 5 in the electric current path from the electrode region (entire region including the front electrode 3, the external plating layer 10, and the auxiliary film 8) to the resistor 5 can be shortened. Furthermore, the thickness of the auxiliary film 8 allows the electric current to easily flow, resulting in reduction in the resistance of the electrode portion and thus ensuring of a low TCR even in the case of the chip resistor having a low resistance.

Furthermore, in the chip resistor 1 according to the first embodiment, since the auxiliary films 8 are formed of a resin material containing conductive particles, it is possible to easily form the auxiliary films 8 using a thick film technique of printing, heating, and curing the resin paste. In particular, in the present embodiment, the auxiliary films 8 are formed of a resin material including metal particles such as Ag and Cu. Reaction of the metal particles with the sulfide gas causes fixation of the sulfide gas to the inside of the auxiliary films 8, thereby reliably preventing the sulfide gas from entering the inside.

Figure 6:
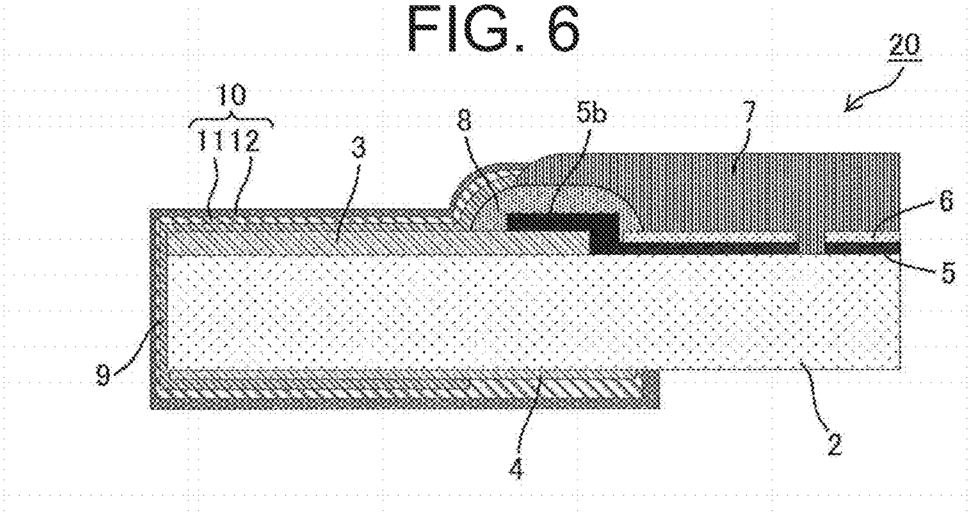
FIG. 6 is a cross-sectional view illustrating a main portion of a chip resistor according to a second embodiment.

FIG. 6 is a cross-sectional view illustrating a main portion of a chip resistor 20 according to a second embodiment. In FIG. 6, features corresponding to those of FIG. 1 to FIGS. 3A and 3B are provided with the same reference signs.

The chip resistor 20 illustrated in FIG. 6 is different from the chip resistor 1 according to the first embodiment in that the connecting portion of the resistor 5 with the front electrode 3 is an exposed portion 5*b* which is not covered with the undercoat layer 6, and the auxiliary film 8 is formed so as to cover the entire exposed portion 5*b*. The other features of the chip resistor 20 are basically the same as those of the resistor 10.

In the chip resistor 20 according to the second embodiment having the structure as described above, the area of the front electrode 3 connected to the external plating layer 10 at a position not covered with the auxiliary film 8 can be increased, in other words, the length of a portion of the front electrode 3 which is located between the auxiliary film 8 and the resistor 5 in the electric current path from the electrode region (the entire region including the front electrode 3, the external plating layer 10, and the auxiliary film 8) to the resistor 5 can be shortened. This enables reduction in the resistance of the electrode portion and thus more effective suppression of the deterioration in the TCR.

Figure 7:
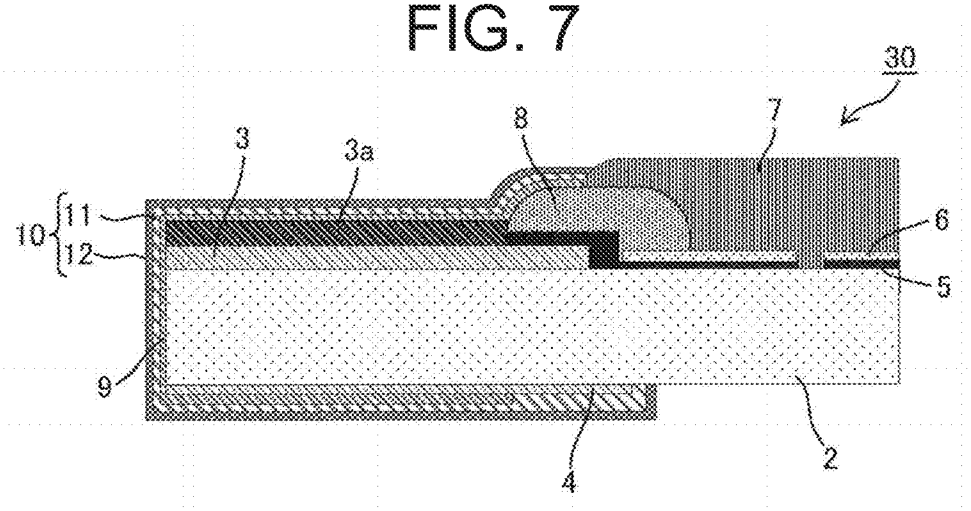
FIG. 7 is a cross-sectional view illustrating a main portion of a chip resistor according to a third embodiment.

FIG. 7 is a cross-sectional view illustrating a main portion of a chip resistor 30 according to a third embodiment. In FIG. 7, features corresponding to those of FIG. 1 to FIGS. 3A and 3B are provided with the same reference signs.

The chip resistor 30 illustrated in FIG. 7 is different from the chip resistor 1 according to the first embodiment in that a second front electrode 3*a* is formed on the top surface of the front electrode 3 other than the connecting portion with the resistor 5, and the auxiliary film 8 is formed at the inner side of the second front electrode 3*a*. The other features of the chip resistor 20 are basically the same as those of the chip resistor 10. Here, the front electrode 3 and the second front electrode 3*a* are made of the same material, and the second front electrode 3*a* is formed on the front electrode 3 before the auxiliary film 8 is formed.

In the chip resistor 30 according to the third embodiment having the structure as described above, forming the second front electrode 3*a* on the front electrode 3 other than the connecting portion with the resistor 5 causes a concave step in the connecting portion of the front electrode 3 with the resistor 5. This concave step enables suppression of flow of the resin onto the second front electrode 3*a* during formation of the auxiliary film 8 made of a resin material in the next step, and therefore, it is possible to accurately form the auxiliary film 8 at a predetermined position.

Furthermore, in the chip resistor 30 according to the third embodiment, both the undercoat layer 6 and the overcoat layer 7 are set to be short with respect to the length of the resistor 5 in the direction between the electrodes. In addition, the auxiliary film 8 is located on the upper portion of the connecting portion between the front electrode 3 and the resistor 5 and the outer plating layer 10 is formed further on the upper portion of the auxiliary film 8, and thus the entire surface of the front electrode 3 is covered with the outer plating layer 10. As a result, the resistivity of the electrode portion can be further lowered, thereby improving the TCR.

Figure 8:
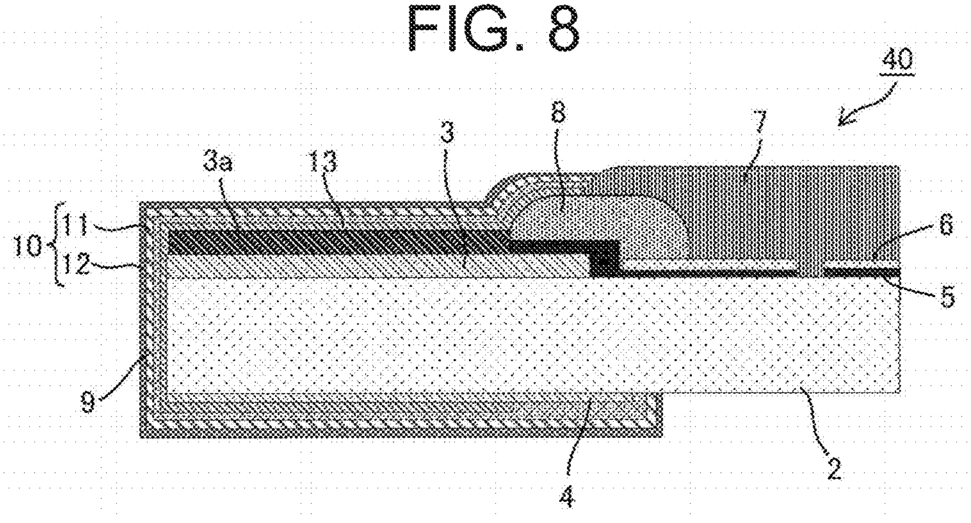
FIG. 8 is a cross-sectional view illustrating a main portion of a chip resistor according to a fourth embodiment.
Figure 9A:
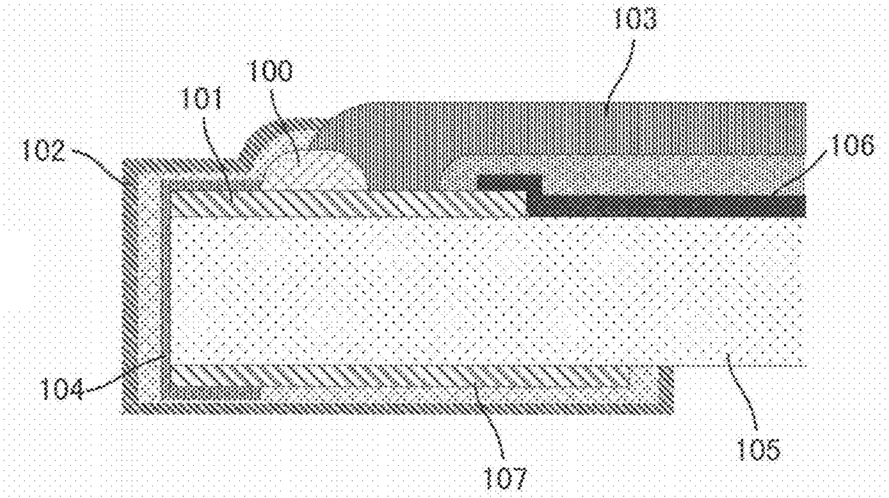
FIGS. 9A and 9B are a cross-sectional view of a chip resistor according to the prior art.
Figure 9B:
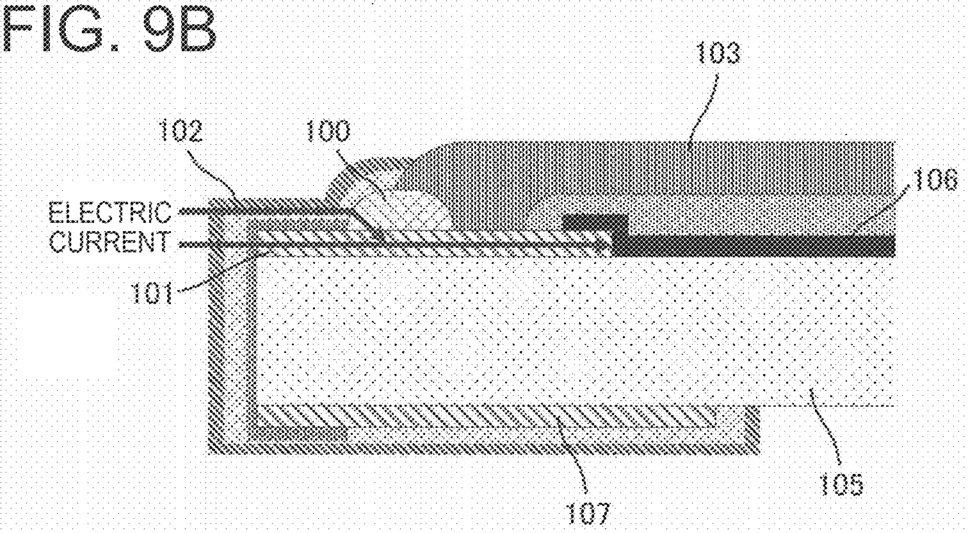
PRIOR ART FIG. 9B

FIG. 8 is a cross-sectional view illustrating a main portion of a chip resistor 40 according to a fourth embodiment. In FIG. 8, features corresponding to those of FIG. 1 to FIGS. 3A and 3B are provided with the same reference signs.

The chip resistor 40 illustrated in FIG. 8 is different from the chip resistor 1 according to the first embodiment in that a Cu layer 13 is provided inside the barrier layer 11 that is a part of the external plating layer 10. The other features of the chip resistor 40 according to the fourth embodiment are basically the same as those of the first embodiment.

In the chip resistor 40 according to the fourth embodiment having the structure as described above, providing the Cu layer 13 inside the barrier layer 11 lowers the resistance of the electrode portion, thereby reducing the TCR. The thickness of the Cu layer 13 is preferably 15 μm to 35 μm, and further providing a Ni layer inside the Cu layer 13 enables stable formation of the Cu layer 13.

The present invention is not limited to the embodiments described above, and various modifications can be made without departing from the technical concept thereof. For example, in the embodiments described above, a chip resistor provided with back electrodes to be electrically connected to the front electrodes on the back surface of the insulating substrate has been described, however, the present invention is also applicable to a chip resistor of the type not provided with such back electrodes.

REFERENCE SIGNS LIST

1, 20, 30, 40 chip resistor
2 insulating substrate
2A large-sized substrate
2B strip-shaped substrate
2C chip-shaped substrate
3 front electrode (electrode)
3*a* second front electrode (second electrode)
4 back electrode
5 resistor
5*a* trimming groove
5*b* exposed portion
6 undercoat layer (first protective film)
7 overcoat layer (second protective film)
8 auxiliary film
9 end face electrode
10 external plating layer
11 barrier layer
12 external connection layer
13 Cu layer

The invention claimed is:

1. A chip resistor comprising:

a rectangular parallelepiped insulating substrate;

a pair of electrodes provided at both ends of a main surface of the insulating substrate;

a resistor that connects between the pair of electrodes;

a first insulating protective film provided on the resistor;

a second insulating protective film provided on the first insulating protective film;

a conductive auxiliary film provided so as to be over a connecting portion between one of the pair of electrodes and the resistor at a position away from an end face of the insulating substrate;

a pair of end face electrodes extending at both end faces of the insulating substrate so as to be connected to the electrodes; and a pair of external plating layers covering the end face electrodes, the electrodes, and the auxiliary film, wherein the connecting portion of the resistor with one of the electrodes is an exposed portion that is not covered with the first insulating protective film, the auxiliary film is formed of a material with sulfide-resistant properties more than that of the electrodes, a portion of the auxiliary film is sandwiched between the first insulating protective film and the second insulating protective film, and at least a portion of the other of the auxiliary film entirely covers the exposed portion in a state of the auxiliary film being in contact with the exposed portion.

2. The chip resistor according to claim 1, wherein the auxiliary film is made of a resin material containing conductive particles.

3. A chip resistor comprising:

a rectangular parallelepiped insulating substrate;

a pair of electrodes provided at both ends of a main surface of the insulating substrate;

a resistor that connects between the pair of electrodes;

a first insulating protective film provided on the resistor;

a second insulating protective film provided on the first insulating protective film;

a conductive auxiliary film provided so as to be over a connecting portion between one of the electrodes and the resistor at a position away from an end face of the insulating substrate;

a pair of end face electrodes extending at both end faces of the insulating substrate so as to be connected to the electrodes; and a pair of external plating layers covering the pair of end face electrodes, the electrodes, and the auxiliary film, wherein both the first insulating protective film and the second insulating protective film are set to be short with respect to a length of the resistor in a direction between the electrodes, the auxiliary film is formed of a material with sulfide-resistant properties more than that of the electrodes, and a portion of the auxiliary film is sandwiched between the first insulating protective film and the second insulating protective film.

4. The chip resistor according to claim 1, wherein in each of the electrodes, a portion thereof other than a connecting portion with the resistor is thicker than the connecting portion with the resistor.

5. A method of manufacturing a chip resistor, comprising:

forming, on an insulating substrate, a resistor and electrodes connected to both ends of the resistor;

forming a first protective film made of a glass material at a position where the first protective film covers a portion of the resistor so that a connecting portion of the resistor with one of the electrodes is an exposed portion;

forming an auxiliary film made of a resin material containing conductive particles at a position where the auxiliary film is over a connecting portion between one of the electrodes and the resistor and covers a portion of the first protective film so as to entirely cover the exposed portion;

forming a second protective film made of a resin material so as to cover a portion of the auxiliary film and the first protective film;

forming an end face electrode connected to a corresponding one of the electrodes by performing sputtering of metal particles onto an end face of the insulating substrate; and forming an external plating layer covering the end face electrode, the corresponding one of the electrodes, and the auxiliary film by performing electroplating.

* * * * *